(12) United States Patent
Ritter et al.

(10) Patent No.: US 6,675,989 B1
(45) Date of Patent: Jan. 13, 2004

(54) WINDSHIELD WASHER PUMP WITH INTEGRATED FLUID LEVEL SENSOR

(75) Inventors: Andreas Ritter, Rochester, MI (US); Mark M. Benner, Lake Orion, MI (US); Karl-Heinz Kuebler, Rochester, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/894,592

(22) Filed: Jun. 28, 2001

(51) Int. Cl.$^7$ ................................................. B67D 5/08
(52) U.S. Cl. ........................... 222/61; 222/64; 417/36; 417/63; 137/558; 239/284.1
(58) Field of Search ....................... 222/64, 61; 417/63, 417/36, 38; 137/558, 392; 239/71, 284.1, 284.2, 302, 333

(56) References Cited

U.S. PATENT DOCUMENTS

| | | |
|---|---|---|
| 3,576,380 A | 4/1971 | Sargeant |
| 3,871,796 A | 3/1975 | Mack |
| 4,822,241 A | 4/1989 | Jarvis et al. |
| 4,838,488 A | 6/1989 | Heier et al. |
| 4,952,914 A | 8/1990 | Mueller |
| 5,071,315 A | 12/1991 | Kiyama et al. |
| 5,078,575 A | 1/1992 | Haas et al. |
| 5,186,606 A | 2/1993 | Egner-Walter et al. |
| 5,257,911 A | 11/1993 | Mota et al. |
| 5,833,441 A | 11/1998 | Danish et al. |
| 5,865,376 A | 2/1999 | Krizek et al. |
| 5,934,872 A | 8/1999 | Yamauchi et al. |
| 6,254,360 B1 | 7/2001 | Sato |

FOREIGN PATENT DOCUMENTS

| | | | |
|---|---|---|---|
| DE | 33 48 409 | 10/1983 | |
| DE | 86 10 016.5 | 5/1986 | |
| DE | 38 27 744 | 2/1990 | |
| EP | 0 448 487 | 9/1991 | |
| EP | 0 712 061 | 5/1996 | |
| EP | 1 067 030 A1 | 1/2001 | ............. B60S/1/48 |
| FR | 2 378 266 | 8/1978 | |
| GB | 1 592 460 | 7/1981 | |
| WO | WO 99 28632 A | 6/1999 | ........... F04D/13/16 |

*Primary Examiner*—Gene Mancene
*Assistant Examiner*—Frederick Nicolas
(74) *Attorney, Agent, or Firm*—J. Gordon Lewis

(57) ABSTRACT

A pump mounted in a housing is fluidically coupled to a vehicle windshield washer fluid reservoir. At least one outlet is carried on the pump housing for discharging fluid pumped from the reservoir. A fluid level sensor is mounted in the housing and has a sensing end projecting into the reservoir. The sensor includes a pair of spaced sensors having the sensing ends exposed to fluid within the reservoir. The sensor has a labyrinth shape adjacent to the sensing ends.

20 Claims, 9 Drawing Sheets

WINDSHIELD WASHER PUMP WITH INTEGRATED FLUID LEVEL SENSOR

BACKGROUND

Vehicle windshield washer systems include a washer fluid reservoir mounted in the engine compartment. A motor-driven pump draws fluid from the reservoir and pumps the fluid under pressure through conduits connected to the pump housing to spray nozzles in the vicinity of the windshield to dispense the fluid over the windshield.

The washer fluid pump, when activated, rotates an impeller in one of two directions to pump fluid through flow channels in the pump housing to different spray nozzles, one of which may also be located on the rear vehicle window.

Fluid reservoir level sensors are mounted on the reservoir to detect a predetermined low fluid level. A sensor output is used to activate an alarm, such as a light, within the vehicle to signal the driver to replenish the washer fluid.

One typical sensor assembly has a tubular column connected to the side of the fluid reservoir and is fluidically coupled to the reservoir at a bottom end. The fluid level in the column, which corresponds to the level of fluid in the reservoir, is detected by a float disposed within the column. Circuitry connected to the float generates the alarm signal at a predetermined float level.

This type of sensor configuration can be complicated due to the many parts and space consumed by the tubular column. This imposes severe design restrictions on the entire windshield washer assembly due to limited space in the engine compartment. The tubular housing also restricts design freedom for the shape and mounting position of the fluid reservoir.

Another sensor arrangement uses two electrodes having free ends spaced apart in the reservoir. The washer fluid shorts the electrodes when the fluid level is above the electrodes and the electrode ends are completely immersed in the washer fluid. When the electrodes are clear of fluid, an open circuit exists between the electrodes which can be detected by circuitry coupled to the electrodes to generate the low fluid level signal.

Such a sensor design is simpler in construction than the separate tubular column sensor, but is still separately mounted in the reservoir from the washer fluid pump.

The windshield washer fluid pump is typically mounted in a housing adjacent to the fluid reservoir and coupled to a discharge outlet on the reservoir. Typically, a multiple-part housing is used to couple the reservoir discharge outlet to a fluid conduit coupled to the pump housing for the discharge of washer fluid through the pump housing and the attached conduit to the remote spray nozzle.

The separate fluid carrying parts of the pump housing require a seal for fluid tight operation. Typically, the seal is a separate, thin, small gasket mounted between two pump housing parts. The gasket is typically held in position between the two pump housing parts by a snap-fit feature wherein the seal fits into a groove on the outside or between the pump housing parts.

However, due to the thin, flimsy nature of the seal, handling and assembly of the seal onto a seal carrier or in the pump housing parts have proven difficult, thereby frequently resulting in improper seal mounting and lengthy assembly time.

In certain windshield washer configurations, the washer pump is a bidirectional pump having two flow outlets formed in the pump housing. Depending upon a direction of revolution of the pump impeller, only the outlet in the direction of revolution is open; while the other outlet is closed. This alternating flow path switching is controlled by a valve system established by two silicone or rubber membranes, one facing up and the other facing down in valve grooves between two parts of the pump housing. The valves are formed as check valves and alternately open and close flow paths to the respective pump housing outlets in response to the direction of fluid flow created by rotation of the pump impeller.

In addition, the seal carrier also carries a motor shaft seal to seal the connection of the pump motor to the impeller. In prior washer fluid pump assemblies, each of these multiple sealing functions required a separate seal element which was separately mounted onto the carrier. This resulted in a relatively expensive, difficult to assemble pump housing.

Thus, it would be desirable to provide a windshield wiper fluid system which has improved level sensing and sealing characteristics as compared to previously devised windshield washer fluid pump systems.

SUMMARY

A windshield washer fluid dispenser apparatus in the form of a pump with an integrated fluid level sensor is disclosed.

In one aspect of the invention, the apparatus includes a windshield washer fluid reservoir having a fluid discharge outlet. A housing having a first fluid inlet and at least one fluid outlet is provided, with the fluid inlet fluidically coupled to the discharge outlet of the reservoir. A pump is mounted in the housing for pumping fluid from the reservoir through the fluid inlet to the fluid outlet. A fluid level sensor is also mounted in the housing and has a sensing end extending from the housing into the reservoir and exposed to fluid in the reservoir.

Preferably, the sensor comprises a pair of sensing electrodes, each having a sensing end, an intermediate portion and an opposed end. The sensing ends of the electrodes are spaced apart and extending outward from the housing into the reservoir for exposure to the washer fluid in the reservoir.

The intermediate portion of each electrode is fixedly mounted in the housing, preferably by insert molding with the housing. The opposed ends of the electrodes are disposed in a connector portion of the housing for connection by an external connector or plug to an external circuit.

In one aspect of the invention, the intermediate portion of the electrodes adjacent to the sensing end has a labyrinth or non-linear shape for secure fixed mounting in the housing by insert molding.

In another aspect of the invention, a pump apparatus for a windshield washer fluid dispenser apparatus is disclosed for use with a washer fluid reservoir. The apparatus includes a pump housing having a fluid inlet for receiving fluid from a reservoir and a fluid outlet for transmitting fluid. A pair of sense electrodes having sensing ends, connector ends and intermediate portions are mounted in the housing, with at least the intermediate portion fixed in the housing. The sensing ends extend from the housing and are adapted for disposition in a washer fluid reservoir so as to be operable to provide a signal depending upon the level of fluid in the reservoir with respect to the position of the sensing ends of the sense electrodes in the reservoir.

The windshield washer pump with integrated fluid level sensor of the present invention uniquely provides a one piece integral pump housing and sensor assembly which simplifies construction of the pump and sensor as well as simplifying mounting of the pump and sensor to a windshield washer fluid reservoir. The number of separate parts in the assembly is minimized to reduce manufacturing costs and simplify assembly.

The sense electrodes are uniquely insert molded in the pump housing to eliminate the separate mounting requirements of the prior art for such electrodes. The electrodes have a labyrinth mounting portion for stable fixed mounting of the electrodes in the housing.

The pump housing itself has snap connected parts for simplified assembly and reduced costs.

BRIEF DESCRIPTION OF THE DRAWINGS

The various features, advantages, and other uses of the present invention will become more apparent by referring to the following detailed description and drawing in which.

DETAILED DESCRIPTION

Figure 1:
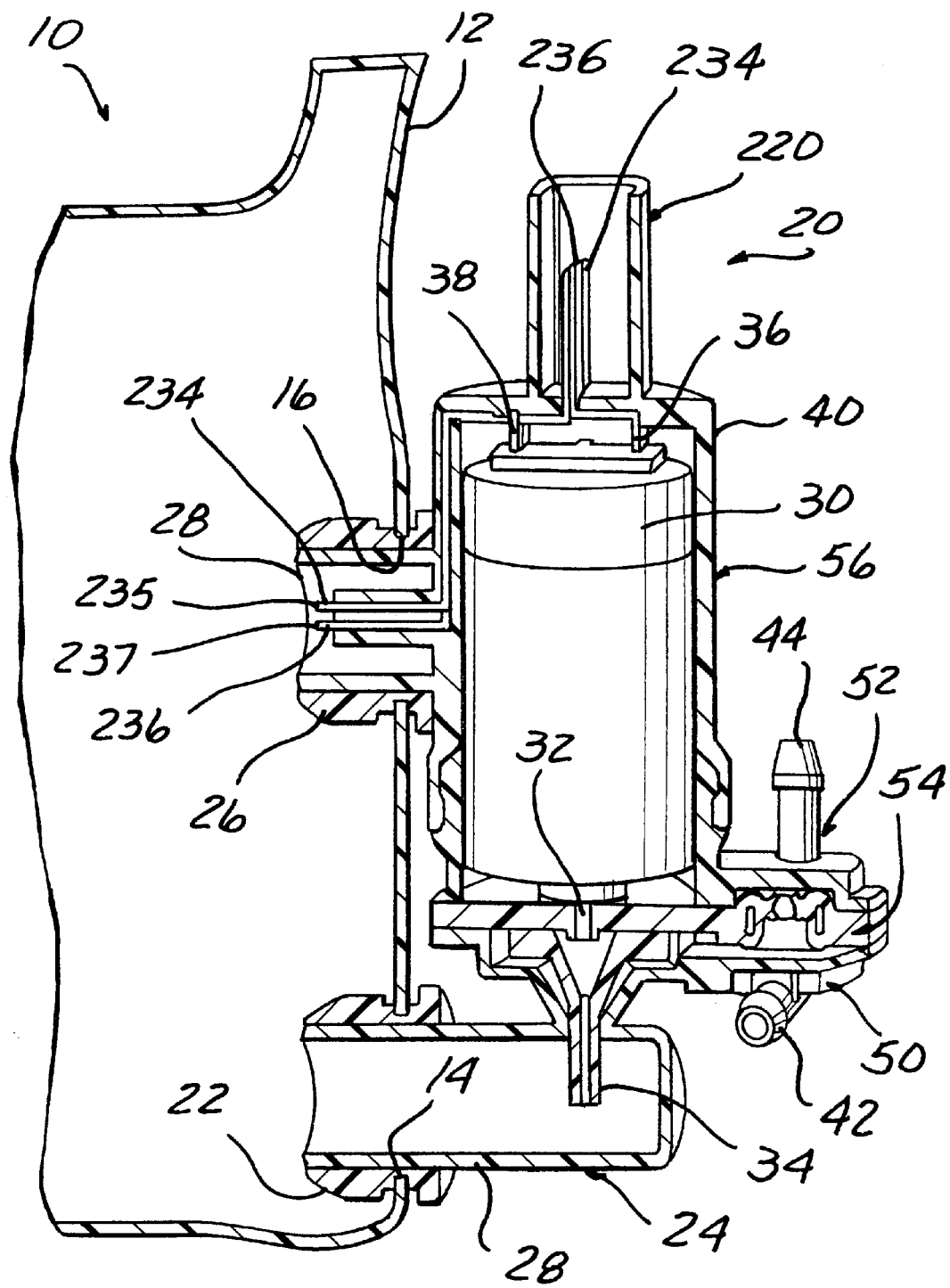
FIG. 1 is a cross-sectional view along a vertical axis of the windshield washer fluid pump with integrated fluid level sensor according to the present invention shown mounted to a fluid reservoir.

Referring now to the drawing, and to FIG. 1 in particular, there is depicted a pictorial representation of a windshield washer fluid reservoir 10. The reservoir 10, which is typically formed of plastic, has a removable fill lid, not shown, for depositing additional amounts of washer fluid into the reservoir 10.

The shape of the reservoir 10 may take many different configurations, depending upon capacity requirements and vehicle engine compartment space considerations. Thus, the shape of the reservoir 10 shown in FIG. 1 will be understood to be representative of any windshield washer fluid reservoir shape.

The reservoir 10 has a sidewall 12 with first and second through bores 14 and 16, respectively. The first bore 14 forms an outlet, also referred to as outlet 14, for the discharge of fluid from the reservoir 10 to a pump apparatus denoted generally by reference number 20. A seal 22, such as a grommet, is mounted, such as by a snap connection as described hereafter, in the outlet 14 to seal the connection between the sidewall 12 of the reservoir 10 and an outlet discharge conduit 24 which is part of the pump apparatus 20.

The second bore 16 in the sidewall 12 of the reservoir 10 also receives a suitable seal, such as grommet 26 in a snap-in connection to the sidewall 12. The grommet 26 sealingly engages a hollow tubular member 28 which forms part of the pump apparatus 20 as described hereafter.

The pump apparatus 20 includes a housing described in detail hereafter which supports a motor 30. The motor 30 is preferably a d.c. motor which receives power via suitable conductors or electrodes, also described hereafter, which are connected to suitable control circuitry which, not shown, includes a user controlled or manipulated switch, not shown.

More preferably, and by way of example only, the motor 30 is a bi-directional d.c. motor capable of driving a motor output shaft 32 in either of two rotary directions. An impeller 34 is mounted on the output shaft 32. When the motor 30 is activated, the motor 30 and impeller 34 function as a pump to forcibly suction windshield washer fluid from the reservoir 10 through the discharge conduit 24, through the impeller 34 and into appropriate fluid flow paths formed in the housing 40 of the pump apparatus 20 and out of at least one and, preferably, two discharge outlets denoted by reference numbers 42 and 44, respectively. It will be understood that the provision of two discharge outlets 42 and 44, one outlet 42 which is connected by a suitable conduit, not shown, to the front windshield washer discharge nozzle or nozzles, and the second outlet 44 being connected by a suitable conduit, also not shown, to the rear window washer fluid discharge nozzle(s) is by way of example only as the pump apparatus 20 could also be constructed for supplying fluid through only one discharge outlet or nozzle 42 or 44.

The pump apparatus housing 40 is formed of a pump cavity 50, a pump housing 52, a composite membrane or composite seal 54 sealingly joining the pump cavity 50 to the pump housing 52 and providing sealed paths for fluid flow through either of the discharge outlets 42 and 44, and a top cover 56.

According to the present invention, the pump housing 40, formed of the interconnected pump cavity 50, the membrane 54, the pump housing 52, the top cover 56, the tubular member 28, and the discharge conduit 24 is unitarily connected to the reservoir 10 via the grommets 22 and 26.

Referring now to FIGS. 2–4 and 12, there is depicted the details of one aspect of the pump cavity 50. The pump cavity 50 has a body 60 formed of a suitable material, such as a moldable plastic. By example only, the pump cavity 50 is formed of acetal copolymer. The pump cavity 50 includes a body 60 having a base 62 from which a peripheral wall 64 projects. The base 62 and the surrounding peripheral wall 64 may take any shape, with the irregular shape shown in FIGS. 2 and 3 being understood to be by way of example only. A recess 66 is formed at one end of the base 62 and extends from a top surface of the base 62 to an inner wall 68.

A notch 67 is formed at one end of the base 62. A smaller notch 69 is formed at the opposite end of the base 62, off-center from a longitudinal axis of the base 62.

A through bore 70 is formed in the inner wall 68, generally centrally within the bore 70. The tubular member 28 described above and shown in FIG. 1 is formed as an integral part of the body 60 and extends from a bottom surface of the base 62 laterally outward beyond the extent of the peripheral wall 64. A bore 72 extends through the tubular member 28 from an open end 74 to an opposite end which is fluidically coupled to the bore 70 extending through the inner wall 68 of the pump cavity body 60.

Figure 2:
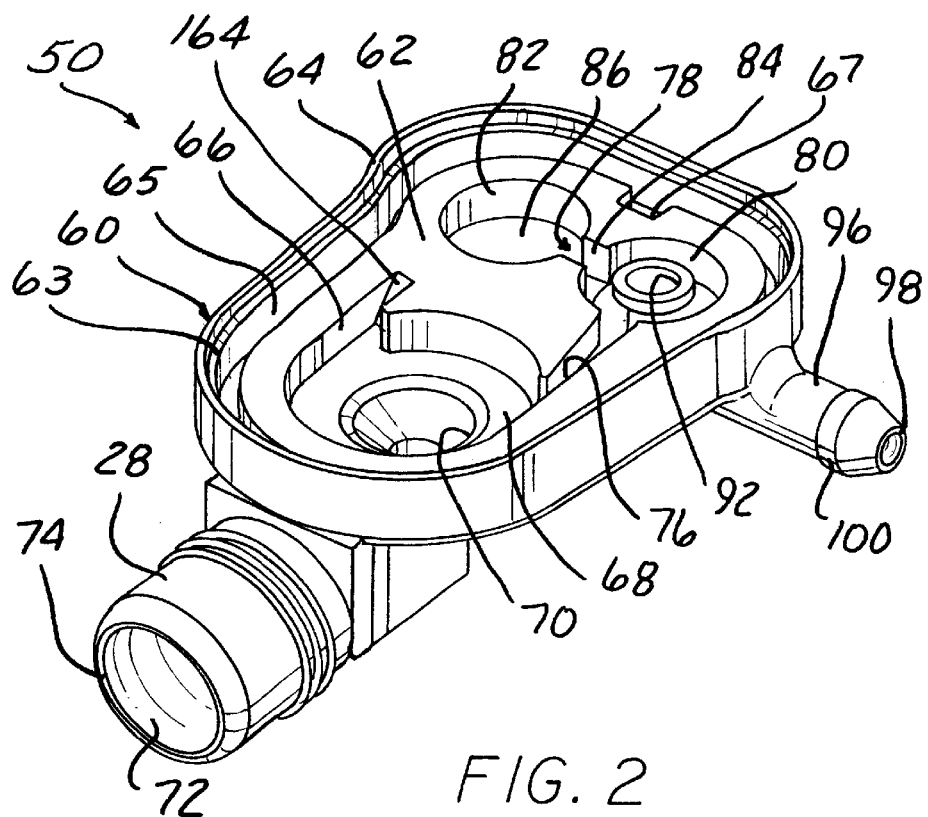
FIG. 2 is a perspective view of the pump cavity with a side inlet according to one aspect of the present invention.
Figure 7:
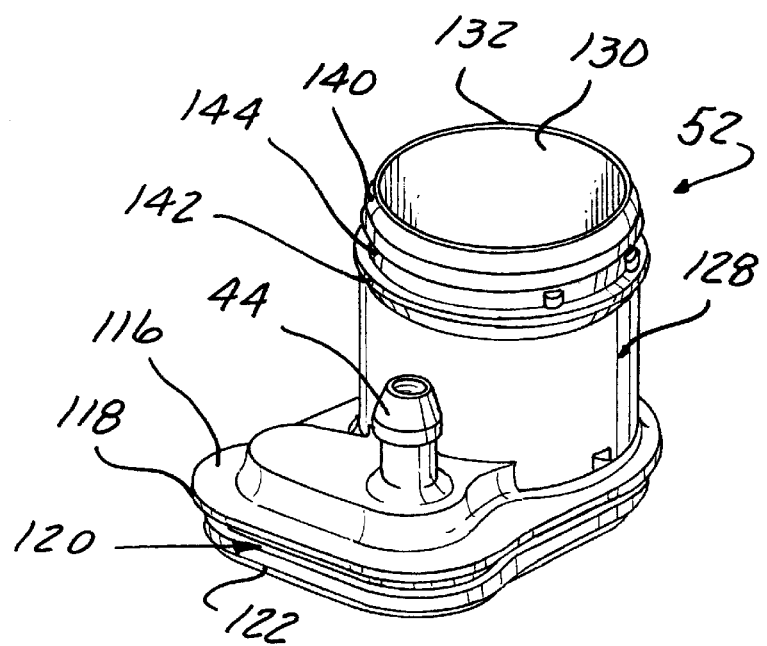
FIG. 7 is a perspective view of a pump housing according to the present invention.

As shown in FIG. 2, the tapered walls of the bore 70 form a seat for receiving the impeller 34, shown in FIG. 1. In this manner, rotation of the impeller 34, when the motor 30 is activated, as described above, will create a suction force within the bore 72 drawing windshield washer fluid from the reservoir 10 under pressure through bores 72 and 70 into a flow-directing channel 76 to a discharge chamber denoted generally by reference number 78. The discharge chamber 78 is formed of first and second generally cylindrical wells 80 and 82, respectively, which are fluidically coupled by a connecting channel 84. In the present exemplary embodiment of the pump cavity 50, the second well 82 is formed with a solid bottom wall 86.

A hollow sleeve 88 projects upwardly from a bottom wall 90 in the first well 80. A bore 92 extends through the sleeve 88 and is fluidically coupled to a bore 94 in a discharge stem 96. The bore 94 extends from the bore 92 to an open end 98 of the stem 96. One or more barbs 100 may be formed exteriorly on the discharge stem 96 for secure attachment of a flexible tube or conduit to the stem 96.

In this manner, the bore 92 in the sleeve 88 in the first well 80 forms an outlet discharge path in conjunction with the bore 94 and the discharge stem 96 for discharging windshield washer fluid drawn into the interior structure of the pump cavity 50 under the control of a check valve assembly, described hereafter, to discharge the washer fluid through the attached conduit to an external windshield spray nozzle, not shown.

The peripheral wall 64 is formed with an undercut 65 along substantially its entire inner extent adjacent to the base 62, with the undercut 65 being formed by a projection 63 extending inwardly toward the hollow interior of the pump cavity 50 from the raised peripheral wall 64.

Figure 5:
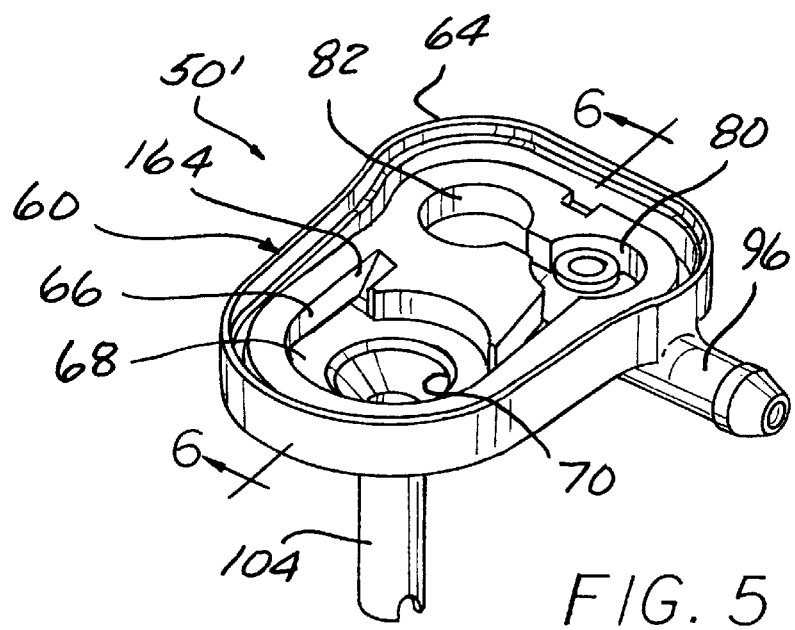
FIG. 5 is a perspective view of a pump cavity with a central inlet according to another aspect of the present invention.
Figure 6:
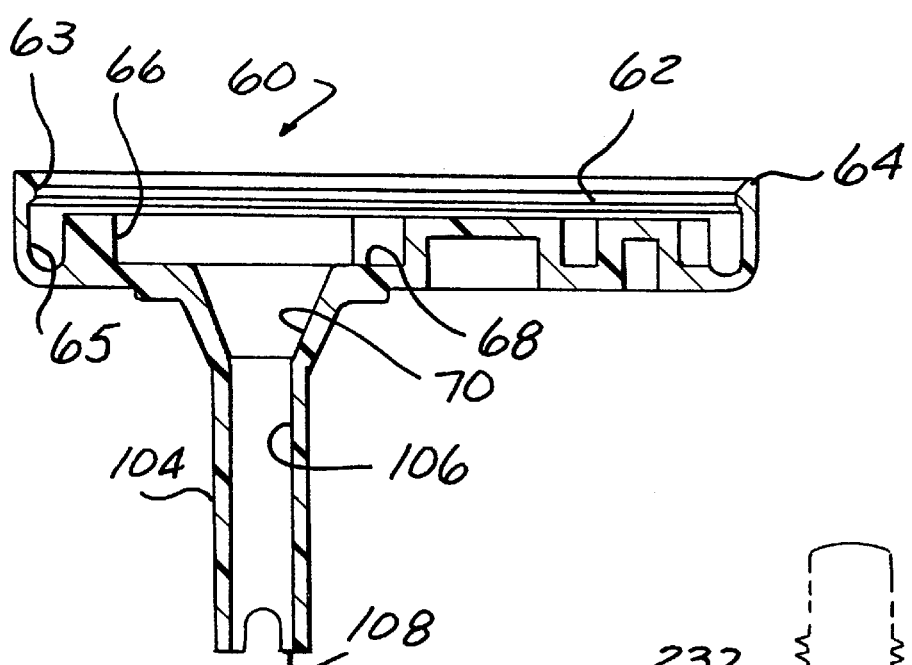
FIG. 6 is a cross-sectional view generally taken along line 6—6 in FIG. 5.

Referring now to FIGS. 5 and 6, there is depicted another aspect of a pump cavity 50' which may be used in the pump apparatus 20 of the present invention. The pump cavity 50' is essentially the same as the pump cavity 50' described above and shown in FIGS. 2–4 except for one modification. In the pump cavity 50', the side mounted inlet tubular member 28 of the pump cavity 50 is replaced by a centrally located, tubular inlet member 104 which is substantially coaxial with the bore 70 in the recess 66 in the body 60 of the pump cavity 50'. The inlet 104 includes a through bore 106 which is fluidically coupled to the bore 70 and terminates in an open end 108.

Referring now to FIGS. 7, 8, 9, and 12, there is depicted the details of the pump housing 52. It is noted that the description and depiction of the pump housing 52 as including one discharge outlet 44 will be understood to be by way of example only as the pump apparatus 20 may be provided with one or two discharge outlets, such as the first and second discharge outlets 42 and 44, shown in FIG. 1. In the case of a single discharge outlet, the single discharge outlet can be either the discharge outlet 42 or the discharge outlet 44. Further, the single discharge outlet 42 or 44 can be provided on either of the pump cavity 50 or the pump housing 52.

The pump housing 52 is preferably formed as a unitary, one-piece body of a suitable material, such as a molded plastic and, more specifically, such as acetal copolymer.

The pump housing 52 includes a wall 116 having a peripheral edge 118 of substantially the same complementary shape as the shape of the peripheral wall 64 of the pump cavity 50. One projection 117 is formed on a bottom surface of the wall 116. Another projection 119 is formed on the opposite end of the wall 116. The projections 117 and 119 mate with notches 67 and 69, respectively, to orient and interlock the pump housing 52 to the pump cavity 50.

The peripheral edge 118 extends outward from a depending sleeve 120. The sleeve 120 includes an enlarged radially outward projection 122 and an undercut or recess 124 formed between the projection 122 and the peripheral edge 118 of the base 116. The projection 122 and recess 124 are complementary to the projection 63 and the undercut 65 formed in the pump cavity 50 to enable the pump cavity 50 and the pump housing 52 to be fixedly joined together by a snap-together connection wherein the projection 63 on the pump cavity 50 slides over the projection 122 on the pump body 52 and into secure engagement with the recess 124 on the pump body 52. Similarly, and at the same time, the projection 122 on the pump body 52 slides over the projection 63 on the pump cavity 60 and into secure engagement with the undercut 65 formed interiorly within the peripheral wall 64 of the pump cavity 50. This eliminates the need for separate mechanical fasteners to fixedly connect the pump cavity 50 to the pump housing 52. At the same time, the pump cavity 50 and the pump housing 52 may be easily disconnected.

An enlarged, generally annular sleeve 128 is formed on and extends away from the wall 116. A bore 130 extends from an open outer end 132 of the sleeve 128.

An inner boss 134 extends from the wall 116 concentrically within the sleeve 128. The boss 134 has an outer surface 136 which defines a seat or support for one end of the pump motor 30. A through bore 138 extends through the boss 134 and receives a flange mounted on one end of the motor 30 through which the motor output shaft 32 extends. In this manner, the sleeve 128 and the inner boss 134 cooperate to support and centrally locate the pump motor 30 as well as the motor output shaft 32 with respect to the bore 70 in the pump cavity 50.

Figure 12:
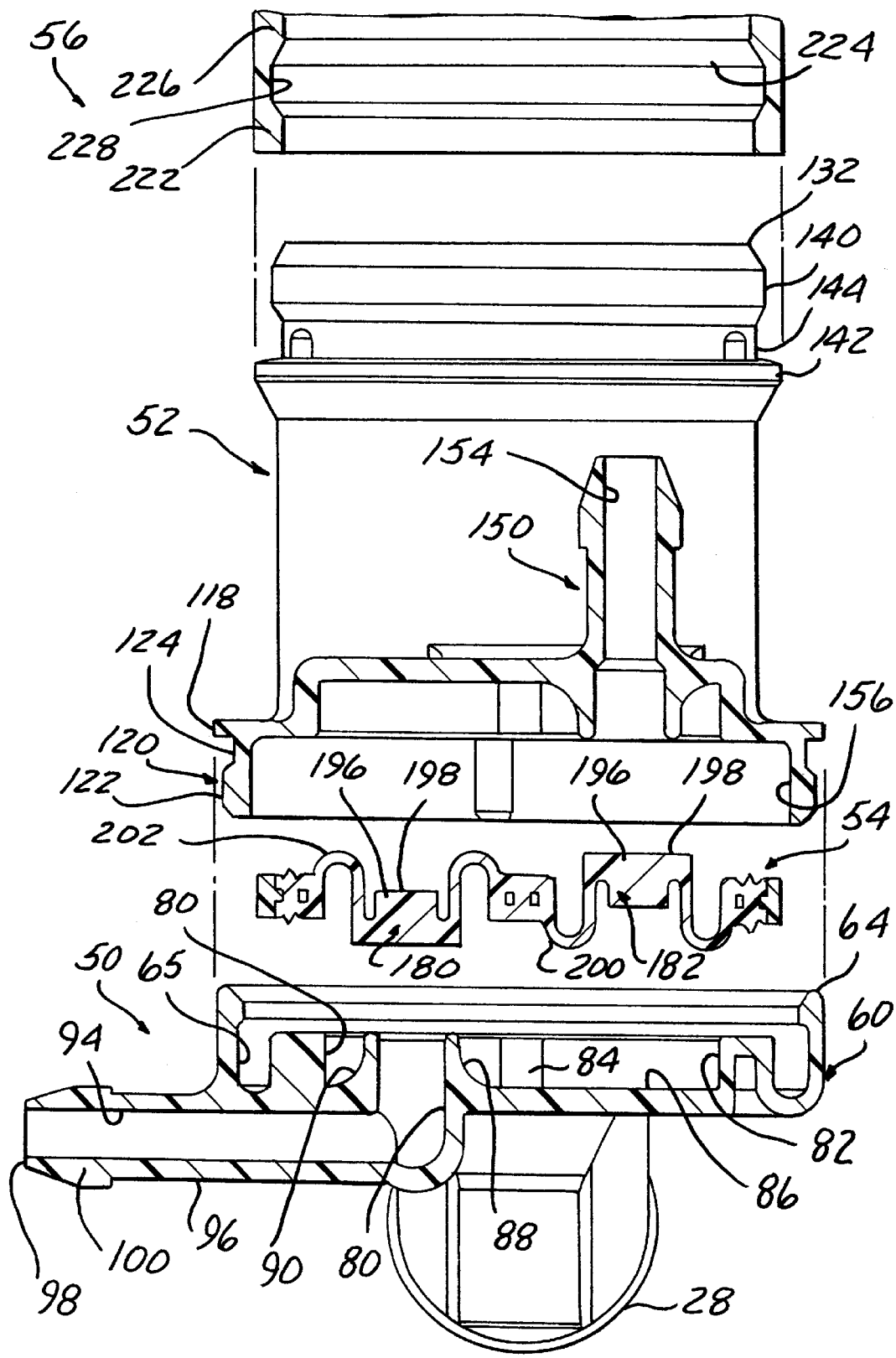
FIG. 12 is an exploded, cross-sectional view of the pump cavity generally taken along line 12A—12A in FIG. 3, of the pump body taken along line 12B—12B in FIG. 8, and of the membrane taken along line 12C—12C in FIG. 10.
Figure 13:
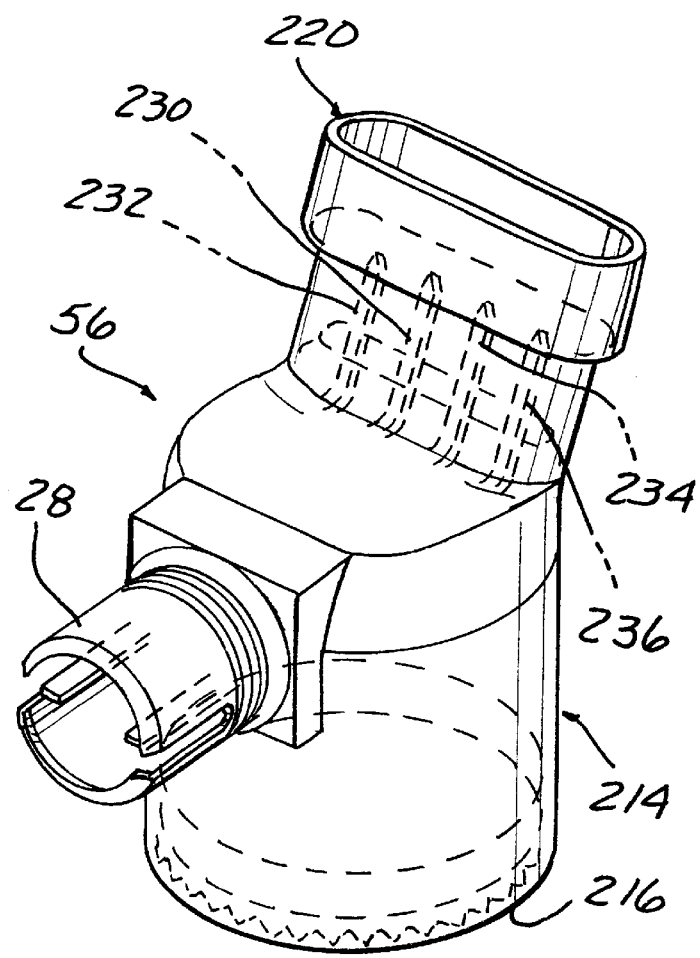
FIG. 13 is a perspective view of the pump housing top cover shown in FIG. 1.

As shown in FIG. 12, the pump housing 52 is designed to be fixedly secured to the top cover 56, preferably by a snap-together connection. Thus, the sleeve 128 is formed with a first radially outward extending projection 140 immediately adjacent the open top end 132. A second projection 142 defining a stop is spaced linearly from the first projection 140 along the length of the sleeve 128 to define a recess or undercut 144 therebetween. As will be described hereafter, the projections 140 and 142 and the recess 144 cooperate with a mating projection and recess formed on the top cover 56 to enable the pump housing 52 to be easily joined to the pump top cover 56 in a snap-together connection.

Another raised boss 148 also extends from the wall 116 of the pump housing 52. The boss 148 supports a discharge stem 150 having at least one exterior barb 152 formed thereon for secure connection with one end of a flexible conduit, not shown. A bore 154 extends through the interior of the discharge stem 150 and is fluidically coupled to an inner chamber 156 formed within the sleeve 120 projecting from the wall 116.

Figure 8:
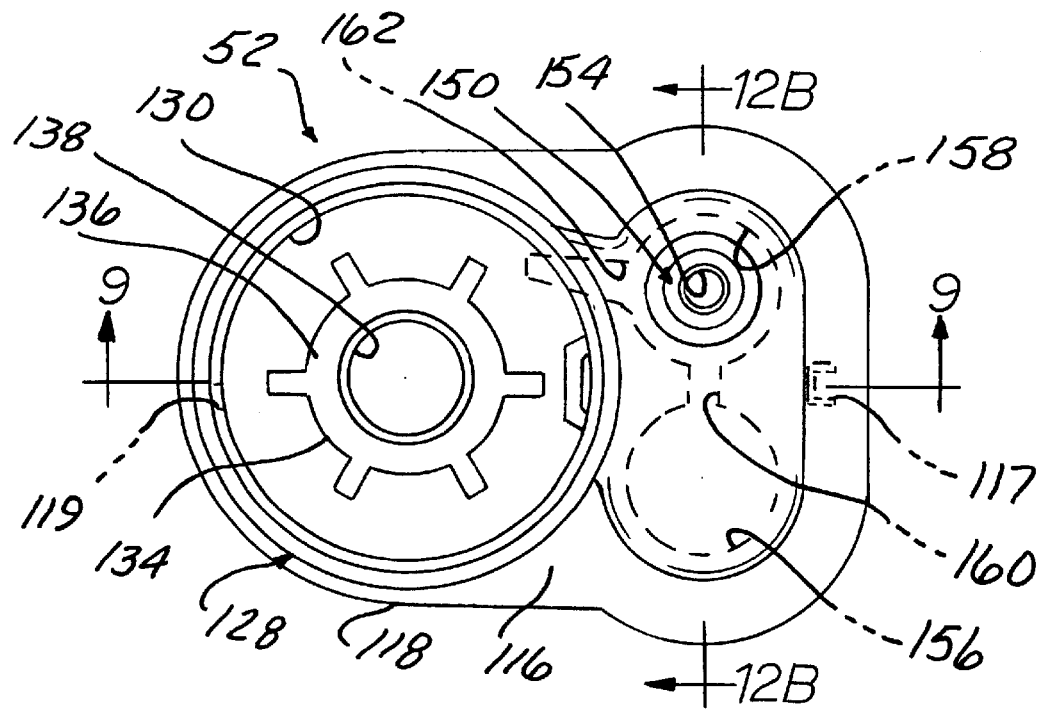
FIG. 8 is a plan view of the pump housing shown in FIG. 7.
Figure 9:
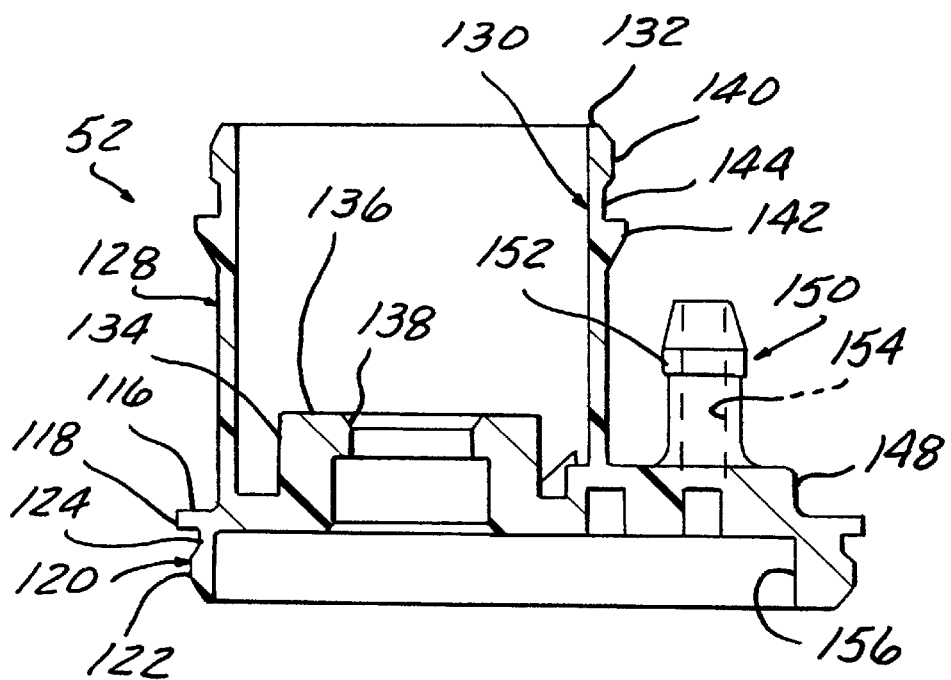
FIG. 9 is a cross-sectional view generally taken along line 9—9 in FIG. 8.

As shown by the hidden lines in FIG. 8, the bottom surface of the wall 116 within the sleeve 120 includes a pair of chambers 156 and 158 which are formed with a complementary shape to the wells 80 and 82 in the pump cavity 50. The two chambers 156 and 158 are fluidically coupled by a channel 160. When the pump housing 52 is joined to the pump cavity 50, as described herein, the chamber 156 will be aligned with the well 80. Likewise, the chamber 158 will be aligned with the well 82. The channel 160 will also be aligned with the connecting channel 84 in the pump cavity 50. However, the wells 80 and 82 will be isolated from the chambers 156 and 158 by a seal or membrane, as described hereafter.

Figure 3:
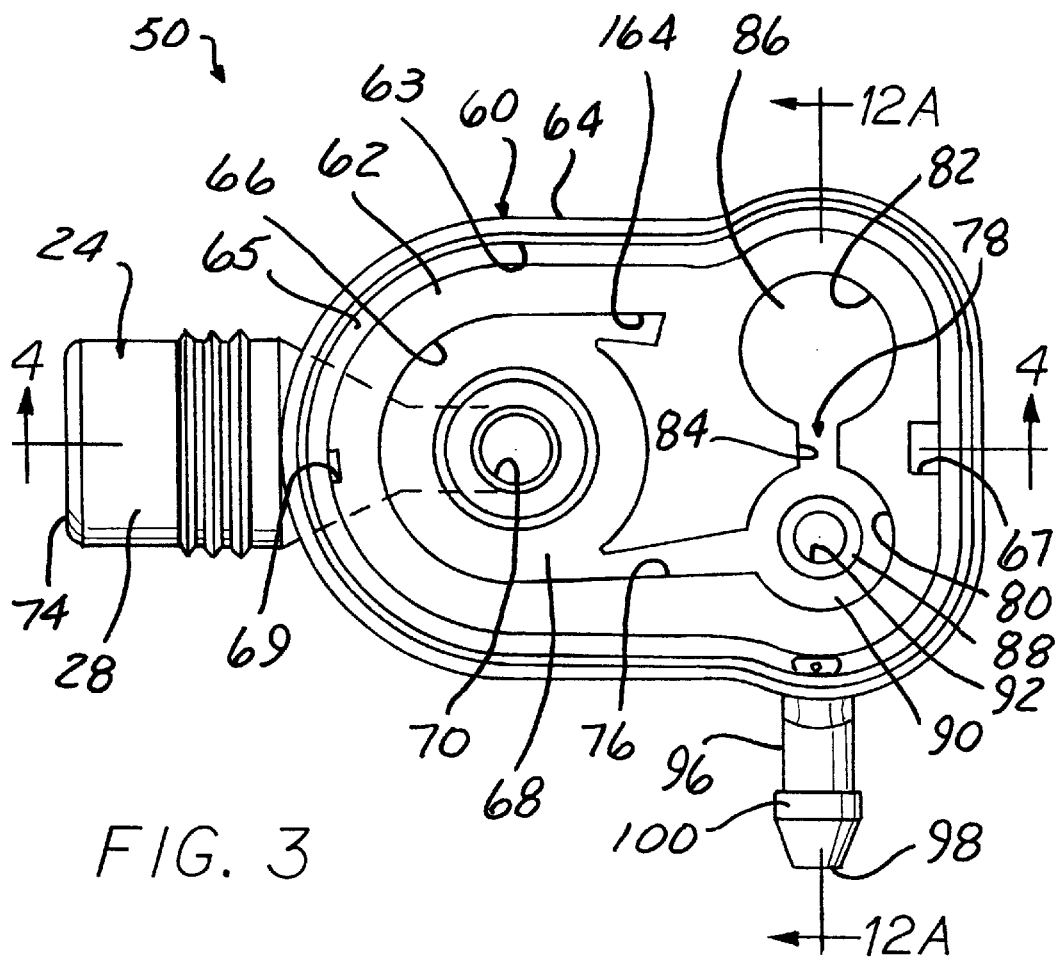
FIG. 3 is a plan view of the pump cavity shown in FIG. 2.
Figure 4:
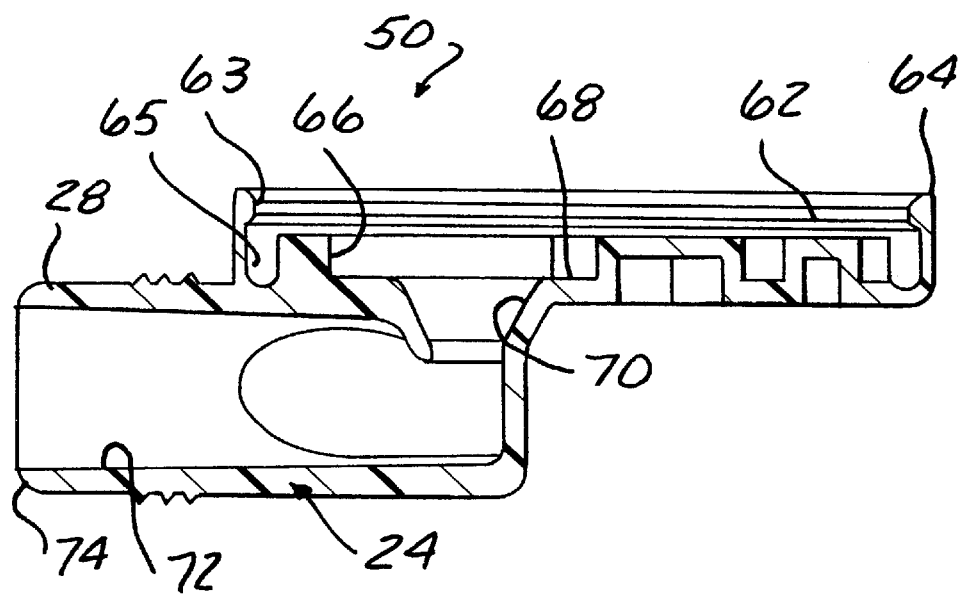
FIG. 4 is a cross-sectional view generally taken along line 4—4 in FIG. 3.

As also shown in FIG. 8, a short length channel 162 projects from the cavity 158 and is fluidically coupled to the chamber 158. The flow channel 162 will be disposed in fluid communication with a similar short length flow cavity 164 formed in the pump cavity 50, as shown in FIGS. 2 and 3, which extends from the recess 66.

Figure 10:
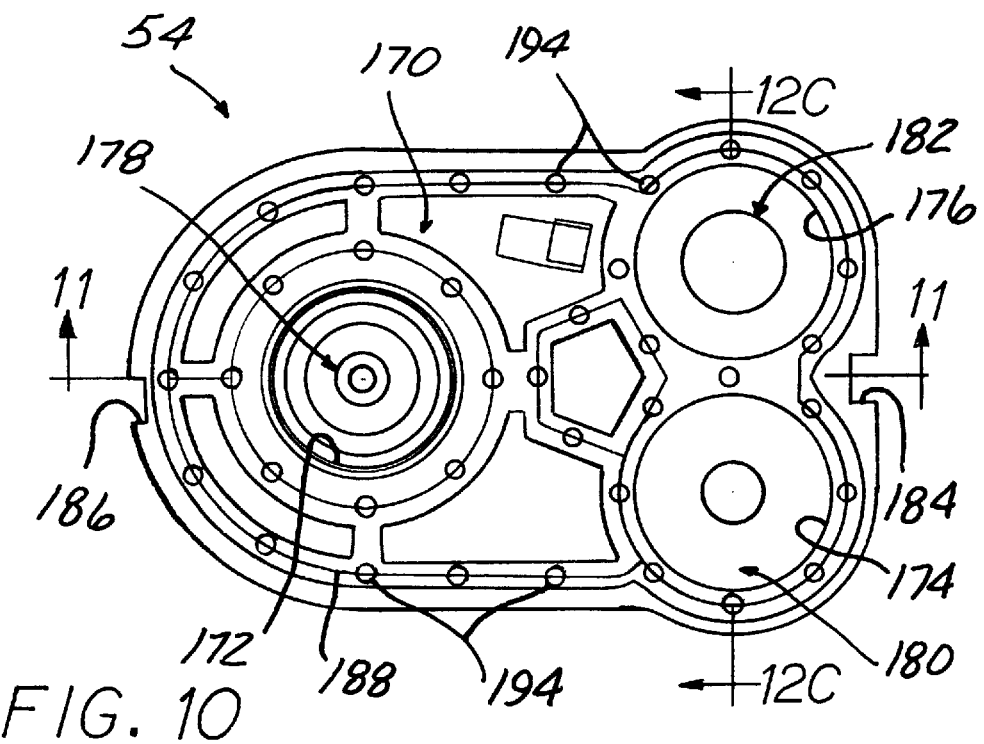
FIG. 10 is a plan view of a composite membrane according to the present invention.
Figure 11:
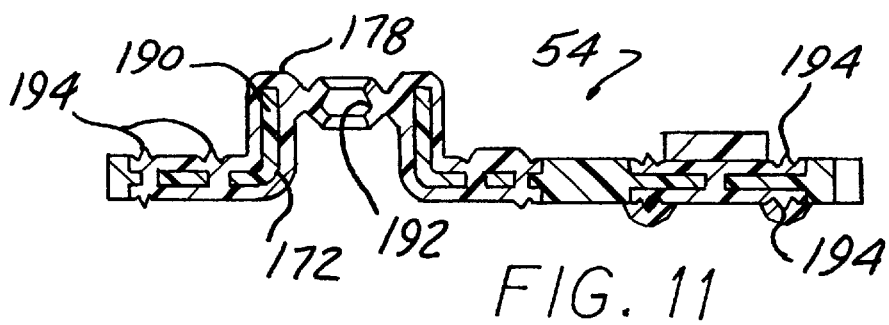
FIG. 11 is a cross-sectional view generally taken along line 11—11 in FIG. 10.

As shown generally in FIG. 1, and in greater detail in FIGS. 10–12, the composite seal or membrane 54 is interposed between the pump cavity 50 and the pump housing 52 and is held in position through the connection of the pump cavity 50 to the pump housing 52.

The membrane 54 serves several functions. First, the membrane 54 acts as a seal between the pump cavity 50 and the pump housing 52. Secondly, the membrane 54 provides a seal for the output shaft 32 of the motor 30 through the pump housing 52. Thirdly, the membrane 54 provides two integral check valves which control the flow of fluid discharged from the reservoir 10 through one of the two discharge stems 96 or 150.

As shown in FIG. 10, the membrane 54 includes a rigid body 170. The body 170 is preferably formed of a suitable rigid plastic, such as filled nylon. The body 170 includes a plurality of apertures 172, 174, and 176. The aperture 172 receives a motor shaft seal 178, as described hereafter. The aperture 174 receives a first check valve 180, and the aperture 176 receives a second check valve 182.

Opposed longitudinal ends of the body 170 are formed with notches 184 and 186 for surrounding the projections 117 and 119, respectively, on opposed ends of the pump housing 52.

A flexible, resilient material, such as rubber, silicone, etc., is insert-molded in runners and in the pattern shown in FIG. 10 on the rigid body 170. Apertures are also formed in the runners through the body 170 to allow the mold material to flow through the body 170 to both sides of the body 170. After the rigid body 170 is supported in a suitable mold, not shown, the resilient material is injected into the mold to fill the cavities and runners in the rigid body 170. The motor shaft seal 178, and the first and second check valves 180 and 182 are also formed during this insert molding process.

The end result is a one-piece membrane 54 which has sufficient rigidity to retain its shape when disposed between the pump cavity 50 and the pump housing 52, and at the same time, has peripheral and interior seals to provide a fluid seal between the pump cavity 50 and the pump housing 52, as well as a motor shaft seal 178, around the motor shaft 32 and the first and second check valves 180 and 182.

Two cross-sectional views of the membrane 54 showing the rigid body 170 and the resilient material 188 are depicted in FIGS. 11 and 12. As shown in FIG. 11, the aperture or bore 172 in the body 170 is formed by an annular wall 190 having the through bore 172 extending therethrough. The motor shaft seal 178 extends across the diameter of the bore 172 at one end of the wall 190. The seal 178 includes a central bore 192 which is slightly undersized when compared to the outer diameter of the motor output shaft 32 so as to form a fluid-proof seal about the rotatable motor output shaft 32.

As shown in FIGS. 11 and 12, a plurality of outwardly extending projections 194, preferably having a conical shape, are formed at generally equally spaced locations along the resilient material 188 on both sides of the rigid body 170. The projections 194, which are resilient in nature, engage the adjacent inner surfaces of the pump cavity 50 and pump housing 52 to insure that a complete fluid-tight seal is formed between the spaced interior surfaces of the pump cavity 50 and the pump housing 52.

The shape of the first and second check valves 180 and 182, respectively, is shown in detail in FIG. 12. Each of the first and second check valves 180 and 182 is formed of a generally cylindrical body 196 of an annular cross section. Each body 196 has a central, narrow diameter portion 198 which is oriented to engage one of the bores 92 and 154 in the pump cavity 50 and pump housing 52, respectively, which communicate with the respective discharge outlets 96 and 150.

Each body 196 of the first and second check valves 180 and 182 is connected to sections of the resilient material 188 disposed in runners on both sides of the rigid body 70 by means of flexible portions, generally in the form of annular rings 200 and 202, respectively, surrounding each of the bodies 196 of the check valves 180 and 182.

As shown in FIG. 12, the bodies 196 of the first and second check valves 180 and 182 are normally pre-tensioned by the annular rings 200 and 202 to the positions shown in FIG. 12 wherein the check valves 180 and 182 normally engage the associated discharge bore 92 and 154, respectively.

In operation, with the membrane 54 sealingy sandwiched between the pump cavity 50 and the pump housing 52, as shown in FIG. 12, the check valves 180 and 182 will assume the normal positions shown in FIG. 12. Assuming that the drive motor 30 is activated for rotation in a direction to direct fluid flow out of the first discharge stem 96 which extends from the pump cavity 50, the motor output shaft 32 will rotate in a predetermined direction to develop a suction force to draw fluid under pressure from the windshield washer reservoir 10 in a direction causing the fluid to flow through the bore 72 in the tubular member 28, through the bore 70 in the pump cavity 50 and then along the flow channel 76 to the well 80 in the pump cavity 50. This pressurized fluid will further extend or move the second check valve 182 against the adjacent inner wall 86 of the pump housing 52 and maintain the reduced diameter portion 198 of the first check valve 180 spaced from the bore 92 in the pump cavity 50. A fluid flow path will thus be formed through the bore 92 and the bore 94 in the discharge stem 96 to the conduit connected to the discharge stem 96.

Conversely, when the motor 30 is activated to rotate the impeller 34 in the opposite direction, the fluid suction from the reservoir 10 will be pressurized to flow in an opposite direction through the fluidically coupled flow channel 164 in the pump cavity 50 and the flow channel 162 in the pump housing 52 to the chamber 158. This pressurized fluid will further extend the position of the second check valve 182 away from the bore 154 in the chamber 156 to establish a fluid flow path through the bore 154 in the discharge stem 150 through the conduit coupled to the discharge outlet 150.

While the check valves 180 and 182 are establishing the desired flow paths through the joined pump cavity 50 and the pump housing 52, the cross flow channels 84 and 160 direct the pressurized fluid flow against the opposed check valve 182 or 180, forcing the check valve 182 or 180 into further sealed engagement with its associated outlet bore 92 or 154.

To complete the pump apparatus 20, the top cover 56 is fixedly joined to the pump body 52 by a snap-in connection similar to the snap-in connection used to join the pump body 52 to the pump cavity 50. As shown in FIGS. 12–16, the top cover 56 is in the form of a one-piece unitary body formed of a suitable material, such as moldable acetal co-polymer. The top cover 56 includes an annular crosssection cylindrical portion 214 which extends from an open first end 216 to an opposed, solid second end 218. A connector portion 220 is integrally joined to the cylindrical portion 214 and extends therefrom. Although the connector portion 220 is shown as extending at an obtuse angle with respect to the solid second end 218 of the cylindrical portion 214, it will be understood that the connector portion 220 may extend at any orientation from the cylindrical portion 214 for ease of connection to a mating connector.

Figure 15:
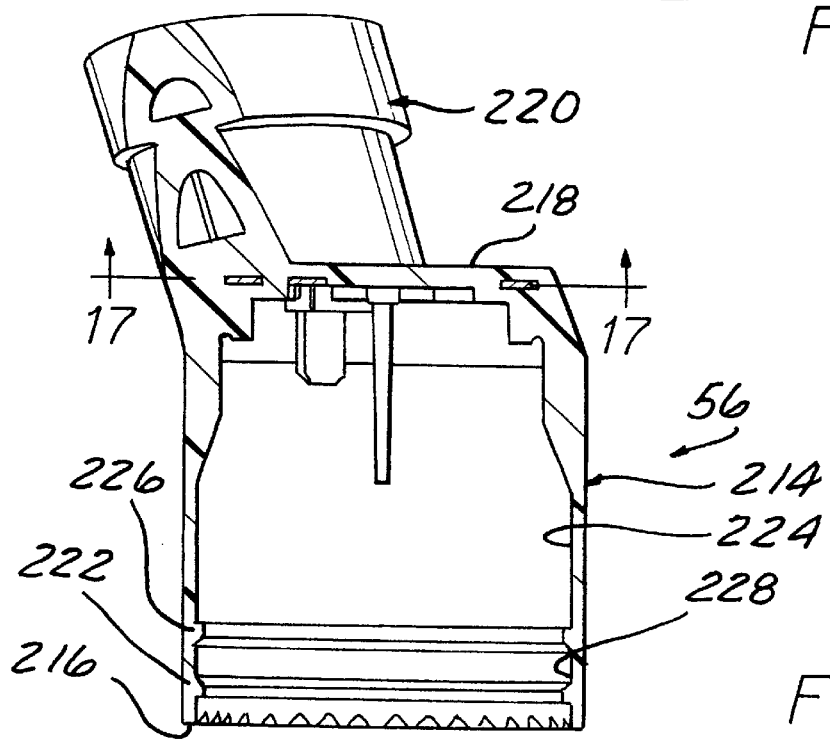
FIG. 15 is a cross-sectional view generally taken along line 15—15 in FIG. 14.
Figure 14:
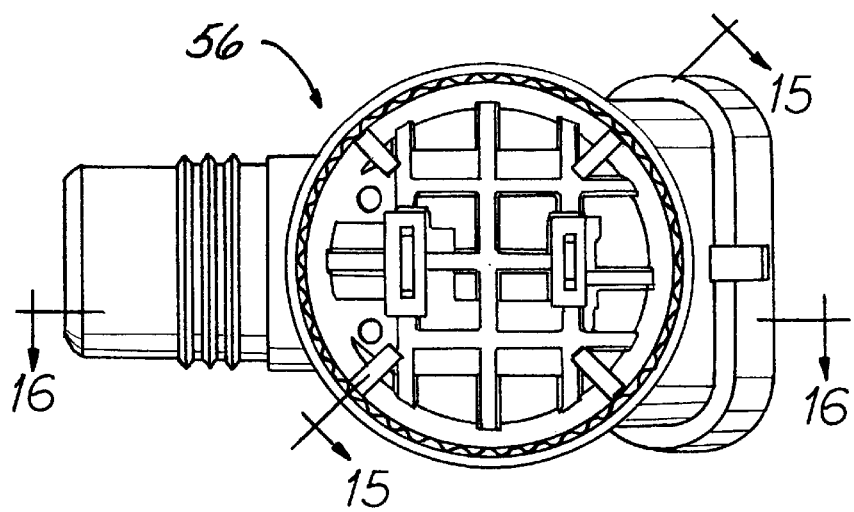
FIG. 14 is a bottom elevational view of the top cover shown in FIG. 13.
Figure 16:
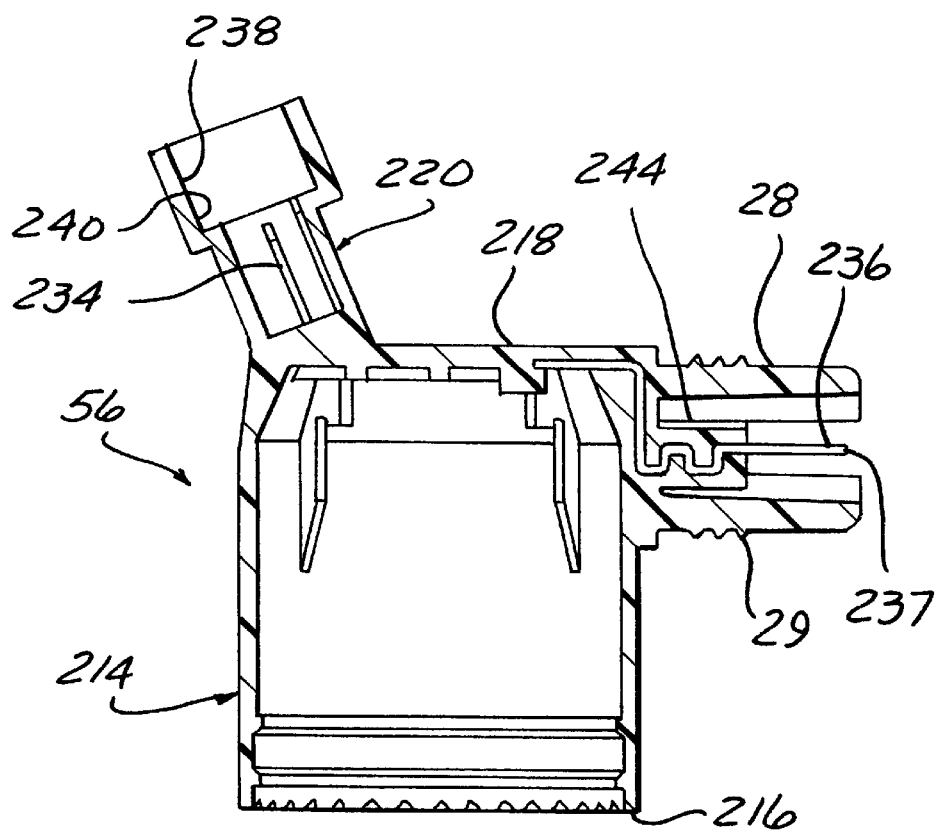
FIG. 16 is a cross-sectional view generally taken along line 16—16 in FIG. 14.

As shown in FIGS. 12, 15 and 16, an annular projection 222 is formed on the inner surface of a bore 224 extending through the cylindrical portion 214 of the top cover 56. A second projection 226 is spaced from the first projection 222 and defines a recess or undercut 228 therebetween. The shape, dimensions and spacing of the first and second projections 222 and 224 and the intervening recess 228 is complementary to the first and second projections 140 and 142 and the intervening recess 144 formed on the exterior surface of the end 132 of the sleeve 128 of the pump housing 52, as shown in FIG. 12. The projections and recesses interlock to join the top cover 56 to the pump housing 52 in a snap-in connection without the need for separate mechanical fasteners.

Figure 17:
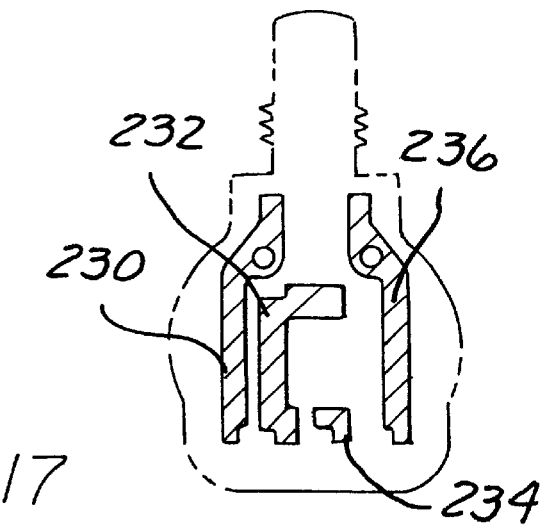
FIG. 17 is a cross-sectional view generally taken along line 17—17 in FIG. 15.

A plurality of electrical conductors, preferably in the form of rigid conductors or bus bars 230, 232, 234, and 236 have one end accessible through an open, outer end 238 in an internal bore 240 in the connector portion 220, and integral portions which are insert molded in the solid upper portion of the cylindrical portion 214 of the top cover 56 as shown in FIGS. 15 and 17. Four conductors 230, 232, 234, and 236 are illustrated by way of example only. Two of the conductors 230 and 232 provide electrical power to the motor 30. The other two conductors or electrodes 234 and 236 form a fluid level sensor which detects a predetermined level of fluid in the reservoir 10 and provides a signal externally of the pump apparatus 20 to a control circuit, not shown, for taking appropriate action, such as activating an alarm or light indicating that the windshield washer fluid level is low.

The insert molding of at least a portion of the electrodes 230, 232, 234, and 236 in the upper portion of the cylindrical portion 214 holds the electrodes in place without the need for additional mounting fasteners or arrangements. Although not shown in the drawing, small dimples or tabs may be originally integrally disposed between the electrodes 230, 232, 234, and 236 and then removed when the electrodes 230, 232, 234, and 236 are placed in the mold die to maintain the spacing between the electrodes 230, 232, 234, and 236 during the initial portion of the insert molding process.

The sensor electrodes 234 and 236 extend from the insert molded portions shown through a mounting boss 244 in FIG. 16 within the tubular member 28 projecting from an upper portion of the cylindrical portion 214 of the top cover 56. The mounting boss 244, which is integrally molded as part of the entire top cover 56, maintains the sensor electrodes 234 and 236 at the desired spacing. The outer ends of the sensors 234 and 236 are exposed and free of insulation.

In operation, the sensors 234 and 236 are attached to an external circuit. The outer ends of each of the electrodes 234 and 236 are disposed within the interior of the reservoir 10 and exposed to any fluid in the reservoir 10. The height or position of the sensors 234 and 236 can be adjusted to detect any desired level of fluid in the reservoir 10. Typically, the ends of the sensors 234 and 236 are positioned to detect a predetermined low level of fluid which will be used to generate an indication to the vehicle operator that the windshield washer fluid needs to be replenished.

The washer fluid itself, when surrounding the sensors 234 and 236, forms a conductive path or circuit between the sensors 234 and 236. This will complete a circuit path to the control circuit driving the sensor electrodes 234 and 236 to indicate that the predetermined low level of fluid has not yet occurred. However, when the fluid level within the reservoir 10 falls below the position of the sensors 234 and 236, this conductive path is broken and an open circuit is formed between the sensors 234 and 236 and circuit which can be used by the external control circuit to indicate the low fluid level and then appropriate action can be taken.

Figure 18:
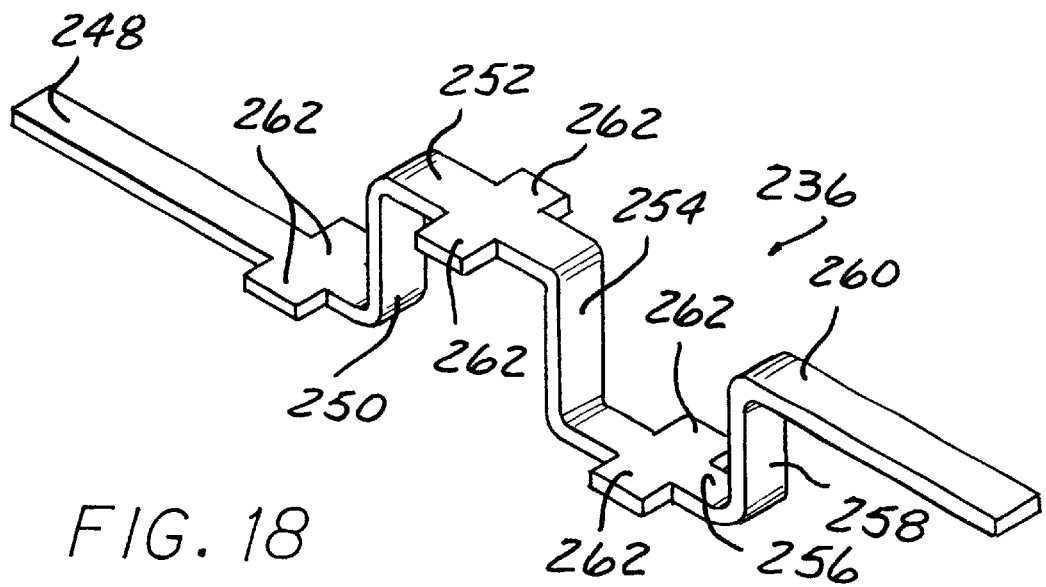
FIG. 18 is an enlarged, perspective view of one aspect of a sensor electrode according to the present invention.

To further insure that the sensor electrodes 234 and 236 remain at the desired spacing, a labyrinth configuration for each of the sensor electrodes 234 and 236 is depicted by way of an optional example in FIG. 18. For the electrode 236, a terminal end of the first portion 248 projecting from the location of the sidewall of the cylindrical portion 214 is bent out of the plane of the first portion 248 at a predetermined angle, generally perpendicular to form a second leg 250. The second leg 250 is in turn bent after a predetermined length at an angle, such as again perpendicular to form a third leg 252. The third leg, in turn, is bent, generally at a perpendicular angle, to form a fourth leg 254. The fourth leg again is bent at a predetermined angle to form a fifth leg 256. A sixth leg 258 and an outer seventh leg 260 are formed in a similar manner. This labyrinth or serpentine, up-and-down configuration, when insert molded in the boss 244 provides a secure mounting position for the sensor electrodes 234 and 236.

Additional stability can be obtained by providing spaced tabs 262 projecting laterally from certain of the legs, such as legs 248, 252, and 256. Opposed pairs of tabs can be provided from opposite side edges of each of the legs 248, 252, and 256.

What is claimed is:

1. A windshield washer fluid dispenser apparatus comprising:
   a windshield washer fluid reservoir having a fluid discharge outlet;
   a housing having a first fluid inlet and at least one fluid outlet, the fluid inlet fluidically coupled to the discharge outlet of the windshield washer fluid reservoir;
   a pump mounted in the housing for pumping fluid from the reservoir through the fluid inlet to the fluid outlet of the housing; and
   a fluid level sensor mounted in the housing and having a sensing end extending from the housing into the reservoir and exposed to fluid in the reservoir, the sensor having a non-linear, labyrinth shape within the housing adjacent to the sensing end and flanges extending laterally from the labyrinth portion of the sensor.

2. The apparatus of claim 1 further comprising:
connector leads, mounted on the housing and connected to the pump and to the sensor for connecting the pump and the sensor to an external electrical circuit.

3. The apparatus of claim 1 wherein the sensor comprises:
a pair of electrodes having the sensing end disposed within the reservoir.

4. The apparatus of claim 3 further comprising:
electrical conductors extending from the pump and connected to the electrodes terminating in connector ends engagable by a connector removably connectable to the housing.

5. The apparatus of claim 1 wherein the sensor has a non-linear, labyrinth shape within the housing adjacent to the sensing end.

6. The apparatus of claim 1 wherein at least a portion of the sensor is molded in the housing.

7. A windshield washer fluid dispenser apparatus comprising:
a windshield washer fluid reservoir having a fluid discharge outlet;
a housing having a first fluid inlet and at least one fluid outlet, the fluid inlet fluidically coupled to the discharge outlet of the windshield washer fluid reservoir;
a pump mounted in the housing for pumping fluid from the reservoir through the fluid inlet to the fluid outlet of the housing;
a fluid level sensor mounted in the housing and having a sensing end extending from the housing into the reservoir and exposed to fluid in the reservoir; and
a sleeve extending from the housing and sealingly mountable through a wall of the reservoir, a bore extending through the sleeve fluidically open to an interior of the reservoir, and the sensing end of the sensor extending through the sleeve.

8. A windshield washer fluid dispenser apparatus comprising:
a windshield washer fluid reservoir having a fluid discharge outlet;
a housing having a first fluid inlet and at least one fluid outlet, the fluid inlet fluidically coupled to the discharge outlet of the windshield fluid reservoir;
a sleeve integrally extending from the housing into a sealed connection with the reservoir, a bore extending through the sleeve open to an interior of the reservoir;
a pump mounted in the housing for pumping fluid from the reservoir through the fluid inlet to the fluid outlet of the housing;
a pair of sense electrodes, each having a sensing end and an opposed end, at least a portion of each sense electrode molded in the housing, the sensing ends of the pair of sense electrodes extending through the sleeve into the reservoir for exposure to fluid in the reservoir; and
electrical conductors extending from the pump and connected to the opposite ends of the sense electrodes terminating in ends, fixedly mounted in a housing, for connection to an external electrical circuit.

9. The apparatus of claim 8 wherein:
the sensing ends of the sense electrodes have a non-linear, labyrinth shape within the housing adjacent to the sensing ends.

10. The apparatus of claim 9 wherein the sensor further comprises:
flanges extending laterally from the labyrinth portion of the sense electrodes.

11. An integrated fluid level sensor and pump apparatus for a windshield washer fluid dispenser including a wash fluid reservoir, the integrated fluid level sensor and pump apparatus comprising:
a pump housing having an inlet for receiving fluid from a reservoir and an outlet for transmitting the fluid externally of the housing;
a pair of sense electrodes having sensing ends, opposed connector ends and intermediate portions, at least the intermediate portions of the sense electrodes fixed in the housing, and the sensing ends extending from the housing and adapted for disposition in a washer fluid reservoir and operative to provide a signal dependent on the level of fluid in the reservoir with respect to the position of the sensing ends of the sense electrodes in the reservoir; and
sealed connections adapted for sealing connecting the inlet of the pump housing and a sleeve projecting from the housing and surrounding the sensing ends of the sense electrodes to the washer fluid reservoir.

12. The integrated fluid level sensor and pump apparatus of claim 11 wherein:
the sensing ends of the sense electrodes have a non-linear, labyrinth shape within the housing adjacent to the sensing ends.

13. An integrated fluid level sensor and pump apparatus for a windshield washer fluid dispenser including a wash fluid reservoir, the integrated fluid level sensor and pump apparatus comprising:
a pump housing having an inlet for receiving fluid from a reservoir and an outlet for transmitting the fluid externally of the housing;
a pair of sense electrodes having sensing ends, opposed connector ends and intermediate portions, at least the intermediate portions of the sense electrodes fixed in the housing, and the sensing ends extending from the housing and adapted for disposition in a washer fluid reservoir and operative to provide a signal dependent on the level of fluid in the reservoir with respect to the position of the sensing ends of the sense electrodes in the reservoir; and
a sleeve extending from the housing and sealingly mountable through a wall of the reservoir, a bore extending through the sleeve fluidically open to an interior of the reservoir; and the sensing end of the sense electrode extending through the sleeve.

14. An integrated fluid level sensor and pump apparatus for a windshield washer fluid dispenser including a wash fluid reservoir, the integrated fluid level sensor and pump apparatus comprising:
a pump housing having an inlet for receiving fluid from a reservoir and an outlet for transmitted the fluid externally of the housing; and
a pair of sense electrodes having sensing ends, opposed connector ends and intermediate portions, at least the intermediate portions of the sense electrodes fixed in the housing, and the sensing ends extending from the housing and adapted for disposition in a washer fluid reservoir and operative to provide a signal dependent on the level of fluid in the reservoir with respect to the position of the sensing ends of the sense electrodes in the reservoir, the sensing ends of the sense electrodes having a non-linear, labyrinth shape within the housing adjacent to the sensing ends, and flanges extending laterally from the labyrinth portion of the sense electrodes.

15. An apparatus connectable to a discharge outlet of a windshield washer fluid reservoir for dispensing windshield wiper fluid comprising:

a housing having a first fluid inlet and at least one fluid outlet, the fluid inlet connectable to the discharge outlet of the windshield washer fluid reservoir;

a pump mounted in the housing for pumping fluid from the reservoir through the fluid inlet to the fluid outlet of the housing;

a fluid level sensor mounted in the housing and having a sensing end extendible from the housing into the reservoir to be exposed to fluid in the reservoir; and a sleeve extending from the housing and sealingly mountable through a wall of the reservoir, a bore extending through the sleeve and connectable to be fluidically open to an interior of the reservoir, wherein the sensing end of the sensor extends through the sleeve.

16. The apparatus of claim 15 wherein the sensor has a non-linear, labyrinth shape within the housing adjacent to the sensing end.

17. The apparatus of claim 15 wherein at least a portion of the sensor is molded in the housing.

18. An integrated fluid level sensor and pump apparatus for a windshield washer fluid dispenser including a wash fluid reservoir, the integrated fluid level sensor and pump apparatus comprising:

a pump housing having an inlet for receiving fluid from a washer fluid reservoir and an outlet for transmitting fluid externally of the housing; and at least one fluid-level sensor having at least a portion fixed in the housing and a sensing end extending outwardly from the housing to be sealingly mounted within the washer fluid reservoir while being exposed to washer fluid to provide a signal based on the sensed level of fluid in the reservoir.

19. The apparatus of claim 18, wherein the sensor has tabs extending laterally outwardly from a portion of the sensor.

20. The apparatus of claim 18 further comprising a sleeve extending from the housing and sealingly mountable through a wall of the reservoir, the sleeve having a bore extending therethrough in fluid communication with an interior of the reservoir, wherein the sensing end of the sensor extends through the sleeve into the interior of the reservoir.

* * * * *